(12) United States Patent
Nakata

(10) Patent No.: US 6,452,934 B1
(45) Date of Patent: Sep. 17, 2002

(54) PACKET FORWARDING APPARATUS

(75) Inventor: Tsuneo Nakata, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/395,612

(22) Filed: Sep. 14, 1999

(30) Foreign Application Priority Data

Sep. 14, 1998 (JP) .......................................... 10-259691

(51) Int. Cl.⁷ ........................... H04L 12/26; H04L 1/00; H04J 3/14; G06F 15/16; G06F 15/173
(52) U.S. Cl. ........................ 370/428; 370/227; 370/392; 370/416; 709/235; 709/240
(58) Field of Search ................................ 370/227, 232, 370/235, 392, 395, 416, 426, 428, 412, 429, 445; 709/235, 240, 238

(56) References Cited

U.S. PATENT DOCUMENTS

| | | | | |
|---|---|---|---|---|
| 4,799,215 A | * | 1/1989 | Suzuki | 370/227 |
| 5,164,939 A | * | 11/1992 | Shobatake | 370/416 |
| 5,400,329 A | * | 3/1995 | Tokura et al. | 370/232 |
| 5,453,980 A | * | 9/1995 | Van Engelshoven | 370/395.53 |
| 5,566,170 A | * | 10/1996 | Bakke et al. | 370/392 |
| 5,590,366 A | * | 12/1996 | Bryant et al. | 709/235 |
| 5,974,467 A | * | 10/1999 | Haddock et al. | 709/240 |
| 6,023,471 A | * | 2/2000 | Haddock et al. | 370/426 |
| 6,104,700 A | * | 8/2000 | Haddock et al. | 370/235 |

FOREIGN PATENT DOCUMENTS

| | | |
|---|---|---|
| JP | 62-227243 | 10/1987 |
| JP | 6-141025 | 5/1994 |
| JP | 6-276206 | 9/1994 |
| JP | 7-264210 | 10/1995 |
| JP | 8-139732 | 5/1996 |
| JP | 8-186584 | 7/1996 |

OTHER PUBLICATIONS

N. Kawase et al, Hitless Frame Switching Scheme for SDH Networks, The Transactions of the Institute of Electronics, Information and Comunication Engineers, vol. J78–B1, No. 12, Dec. 1995, pp. 764–772.

D. Y. Al–Salameh et al, "Optical Networking", Bell Labs Technical Journal, Jan.–Mar. 1998, pp. 39–61.

* cited by examiner

Primary Examiner—Wellington Chin
Assistant Examiner—M. Phan
(74) Attorney, Agent, or Firm—Mattingly, Stanger & Malur, P.C.

(57) ABSTRACT

In a communication network having a plurality of terminals, such as packet forwarding apparatus, and a transport network which provides a connection between the terminals, when the transport network performs a state transition associated with a brief disconnection, a brief disconnection begin notification signal is sent to a terminal prior to a state transition operation and a brief disconnection end notification signal is sent to the terminal after the state transition operation. The terminal reroutes communication data to a storage or a redundant transport route during the period between the receipt of the brief disconnection begin notification and the receipt of the brief disconnection end notification. Accordingly, the communication data loss due to the brief disconnection between terminals associated with the state transition of the transport network can be reduced or eliminated.

2 Claims, 6 Drawing Sheets

PACKET FORWARDING APPARATUS

BACKGROUND OF THE INVENTION

1. Field of the Invention

The present invention relates to packet forwarding apparatus (equipment) for performing the transmission of telecommunication traffic packets and further relates to a communication network having a plurality of terminals and a transport network for interconnecting the plurality of terminals.

2. Description of the Related Art

A packet switching method for controlling the transmission data in packets is broadly employed in data communication networks or local area networks whose number of nodes is large and whose bandwidth necessary for each node varies during a short period of time. This is because the packet switching method can effectively utilize a transport bandwidth as compared with a circuit switching method. The circuit switching method is a switching method for controlling the transmission data in units having a multiplexed and determined transport rate by space division multiplexing, time division multiplexing, frequency division multiplexing and code division multiplexing. It is difficult for a network using the packet switching method (hereinafter, a packet switched network) to always maintain a transport bandwidth for a designated route and monitor a transport status as in a network using the circuit switching method (hereinafter, a circuit switched network) and a delay for every node on a traffic path is large because switching is performed by the store and forward method. Therefore, in a packet switched network, it is difficult to construct a highly reliable network as compared with a circuit switched network.

On the other hand, the circuit switching method is always employed for a backbone network having a relatively small number of nodes and requiring a high reliability. The demand of a bandwidth for the backbone network has been increasing these days and a switch having a large switching unit capacity is required for the main network. The reason for that demand is that (1) it is preferable to reduce the number of switches, each of which operates for a high speed recovery from a failure, and (2) it is preferable to minimize the size and cost of the hardware by restricting the number of the circuits being applied to backbone nodes.

Most actual large scale datagram networks have a multilayer structure where a packet switched network employs the backbone network as a transport medium. In such a communication network, the packet switched network overlays the circuit switched network. The problem with having the data network overlaying the packet switched network on the circuit switched network is that there is a brief disconnection caused by an instantaneous cut off through switching by the circuit switched network.

In the present packet forwarding protocol, the receipt confirmation of a packet is performed by a receiver side that transmits a receipt notification message (ACK packet) to a transmitter side. When the packet is not received, the receiver side outputs a resending request to the transmitter side by a non-receipt notification message (NAK packet).

In the current operated packet switched network, the data communication service is remedied by the data recovery through the data resending rather than the data switching without data loss. When a circuit having a large capacity halts the data transmission service temporarily, an enormous amount of control packets are generated for resending non-received packets and the utilization efficiency of the network bandwidth deteriorates. Since resending by the packet forwarding protocol takes time to transmit the control packet therebetween, failures may sometimes occur for the service which requires the real time responsibility for transmitting voice data and for the service necessary to keep an order of arrival packets.

In the research level, there is an attempt to perform the switching without disconnection on the packet switched network. In particular, in an asynchronous transfer mode (ATM) network, there is proposed a method for switching without disconnection in which data are always transmitted to pluralities of routes. At the time of switching, a selector on the receiver side changes the connection destination after the selector on the receiver side synchronizes a signal from the switching source route with a signal from the switching destination route.

There is a problem with the above proposal in that it is difficult to perform the synchronization of data coming from pluralities of routes. In order to solve this problem, there is proposed a method for the insertion of a cell that is marked, as described in a Japanese laid open patent No. 7-264210, and/or for transmitting a dummy cell until when there is no useful information on the both switching source and destination routes, as described in a Japanese laid open patent No. 8-139732.

The switching without disconnection in the circuit switched network is studied in the network of SONET/SDH standard, as described in Kawase et. al., "Hitless Frame Switching Scheme for SDH Networks," (The institute of Electronics, Information and Communication Engineers, Vol. J78-BI No.12, pp. 764–772, 1995). Because the network of SONET/SDH standard is a synchronous network, it is necessary to perform accurate control as compared with the switching without disconnection in the packet switched network since the synchronization within a byte must be implemented for matching the signal phase of data coming from the pluralities of routes at the time of switching.

Although the conventional SONET/SDH method has been broadly employed in the backbone network, an installation of an optical switching method for performing the switching by using an optical switch to the backbone network is studied. The optical switching method is by switching with a light without an optical-electrical conversion of the main signal at the time of switching an optical transport route.

The feature of the optical switching method is that a switching unit capacity can be increased as compared with an electrical switching in the SONET/SDH method. However, it is difficult for an optical signal to store the data signal into a storage. Thereby, it is still difficult for an optical switching network to perform the switching without disconnection by using a buffer memory for storing a data signal.

SUMMARY OF THE INVENTION

An object of the present invention is to reduce an amount of packet data loss when the state transition or state change occur in association with the brief disconnection in the circuit switched network (e.g., brief disconnection for the recovery from the transport route failure) upon which the packet switched network is overlaid.

The packet switched network is configured by connecting a plurality of packet forwarding apparatus with a transport link. In the packet switched network overlaying the circuit switched network, a circuit corresponds to a transport link. The packet forwarding apparatus of the present invention is assumed to include a storing means. Although most packet forwarding apparatus include the storing means for performing a switching by a store-and-forward method, it is preferred to add a storing capacity when the storing means does not have a capacity sufficient for an embodiment of the present invention. It is still preferred to insert or add a storing means into the packet forwarding apparatus for applying the embodiment of the present invention to a packet forwarding apparatus not including the storing means. When a circuit connected with the packet forwarding apparatus undergoes a brief disconnection caused by switching, after a packet data transmitted to the circuit only during the period of the brief disconnection is stored into the storing means, if a packet transmission to the circuit is halted, the data loss on the packet switched network can be avoided. The packet transmission halt is performed by receiving a brief disconnection begin notification from the circuit switched network. When the circuit switched network is going into the state transition, the brief disconnection begin notification is produced by an administrator, an administration apparatus of the circuit switched network or a transport supervisory apparatus and is transmitted to the packet forwarding apparatus through the supervisory channel prepared for each circuit or the supervisory network being prepared. When the period requiring the brief disconnection has finished, the circuit switched network sends a brief disconnection end notification to the packet forwarding apparatus and the packet forwarding apparatus that receives the brief disconnection end notification restarts the data transmission stored in the storing means.

Figure 1:
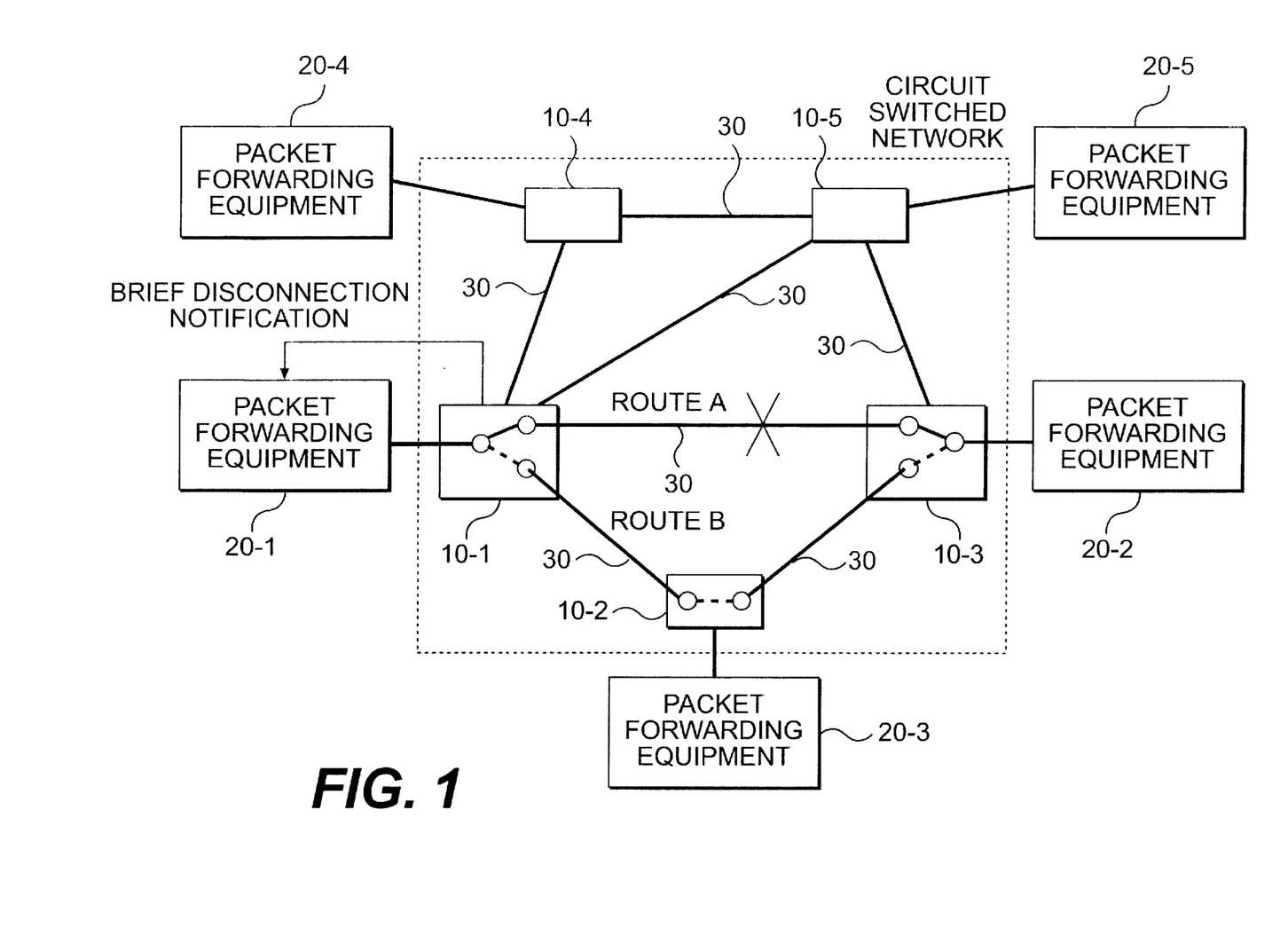
FIG. 1 shows an example block diagram describing a communication network based upon an embodiment of the present invention.

FIG. 1 shows an example network configuration that realizes the aforementioned function. The network as in FIG. 1 has packet forwarding apparatus 20-1 through 20-5 and a circuit switched network for providing a connection between the packet forwarding apparatus, and the circuit switched network includes circuit switching apparatus 10-1 through 10-5 and transport link 30 for connecting between the circuit switching apparatus. When there occurs the necessity to change a transport route A between packet forwarding apparatus 20-1 and 20-2 to a transport route B between packet forwarding apparatus 20-1 and 20-3, the circuit switched network sends a brief disconnection begin notification to a packet forwarding apparatus 20-1 on the transmitter side, halts a packet transmission from the packet forwarding apparatus 20-1 and performs the switching by using each circuit switching apparatus. After the switching is completed, the circuit switched network sends a brief disconnection end notification to the packet forwarding apparatus 20-1 and the transmission of the packet from the packet forwarding apparatus 20-1 is restarted.

For another method, at the time of the brief disconnection during the service of the circuit switched network, the service failure in the packet switched network can be avoided by providing packet forwarding apparatus on the transmitter side and on the receiver side useful for temporarily changing a route of a packet data being transmitted via the circuit switched network to a redundant circuit useful for rerouting.

Figure 2:
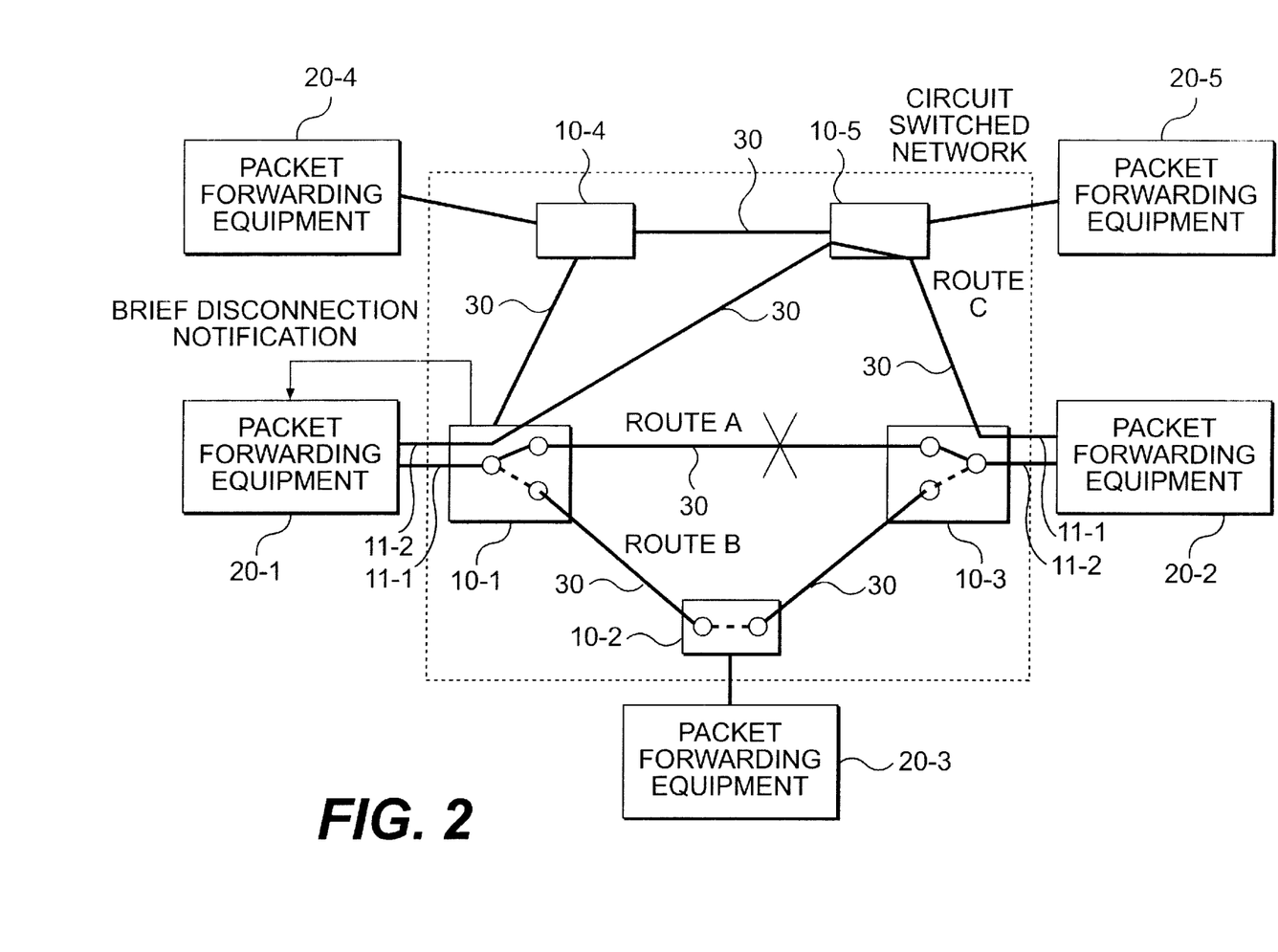
FIG. 2 shows an example block diagram describing the communication network based upon the embodiment of the present invention.

FIG. 2 shows an example configuration of the circuit switched network embodying the aforementioned method. The network as in FIG. 2 includes packet forwarding apparatus 20-1 through 20-5 and a circuit switched network for providing a connection between the packet forwarding apparatus and the circuit switched network further includes circuit switching apparatus 10-1 through 10-5 and transport links 30 for connecting between the circuit switching apparatus.

Circuit switching apparatus 10-1 and 10-2 provide both a port 11-1 connected with routes A or B as a transport route between the packet forwarding apparatus 20-1 and 20-2 and a port 11-2 connected with a redundant route C different from any one of the above routes. In the circuit switched network of FIG. 2, at the time of switching the circuit switched network, a brief disconnection begin notification is transmitted from one of the circuit switching apparatus in the circuit switched network to a packet forwarding apparatus on the transmitter side, a packet forwarding apparatus on the receiver side or both of them. When either one of the packet forwarding apparatus receives the brief disconnection begin notification, the packet forwarding apparatus on the transmitter and receiver sides operate together and switch a port sending and receiving a packet, which is useful for the packet transmission, with a port connected with a redundant route only during the circuit switching operation.

BRIEF DESCRIPTION OF THE DRAWINGS

The embodiments of the present invention are described below in conjunction with the figures, in which.

DESCRIPTION OF THE PREFERRED EMBODIMENT

A description will be given of the present invention by reference to the accompanying drawings.

An example embodiment of the present invention is applied to a circuit switched network in which there occurs a brief disconnection at the time of switching to a communication network as a transport medium used by a packet switched network. When the embodiment of the present invention is applied to the communication network, there is the least data loss in the packet switched network and a switching of an optical switching network can be performed. The optical switching network sends a brief disconnection begin notification to a packet forwarding apparatus in the upper level before the switching, sends a brief disconnection end notification after the switching is completed and when the packet forwarding apparatus stores all of input data during the period between the receipt of the brief disconnection begin notification and the receipt of the brief disconnection end notification, there is no data loss on the packet switched network or it is difficult to have any data loss.

Figure 3:
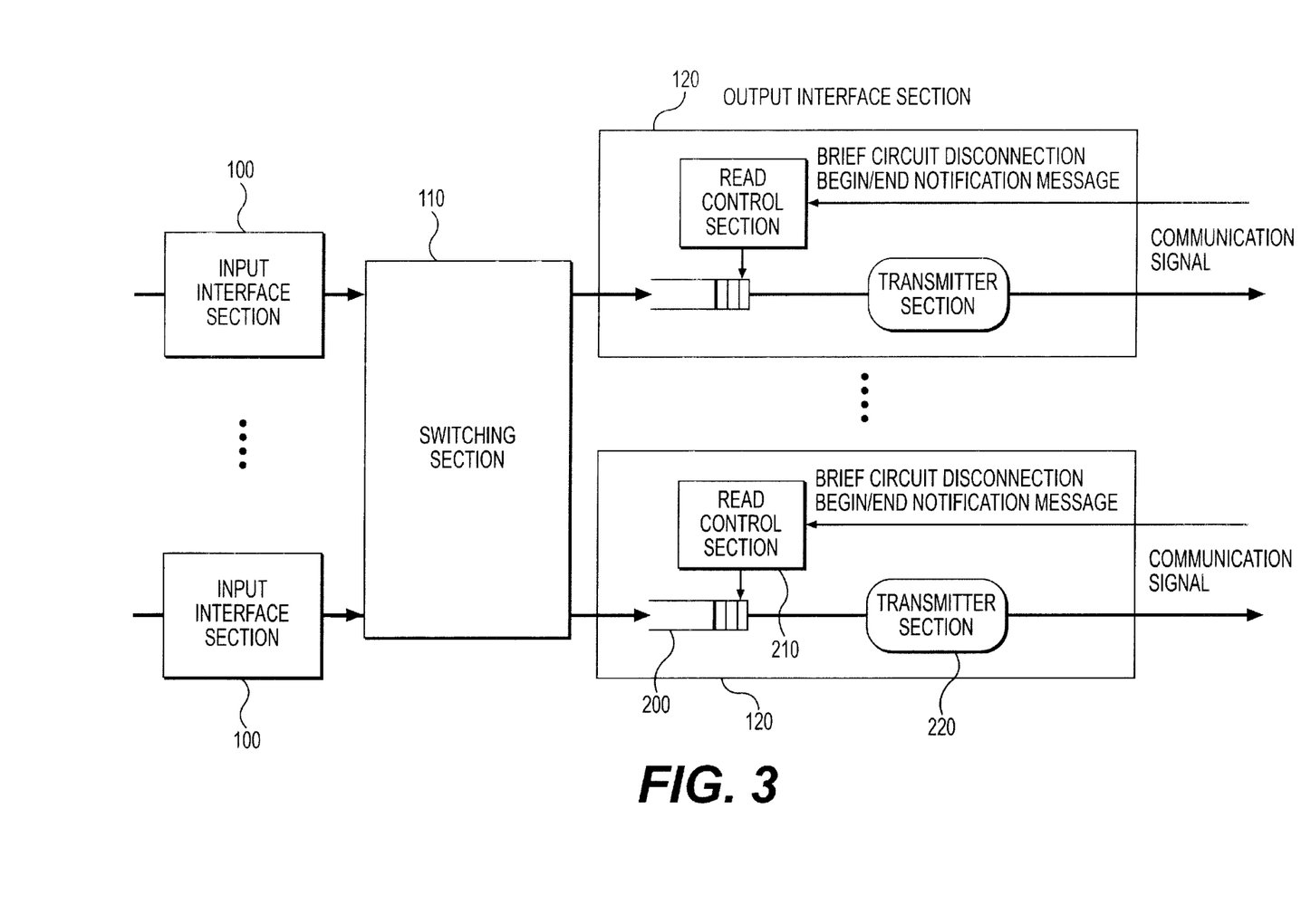
FIG. 3 shows a block diagram describing an example packet forwarding apparatus based upon the embodiment of the present invention.
Figure 4:
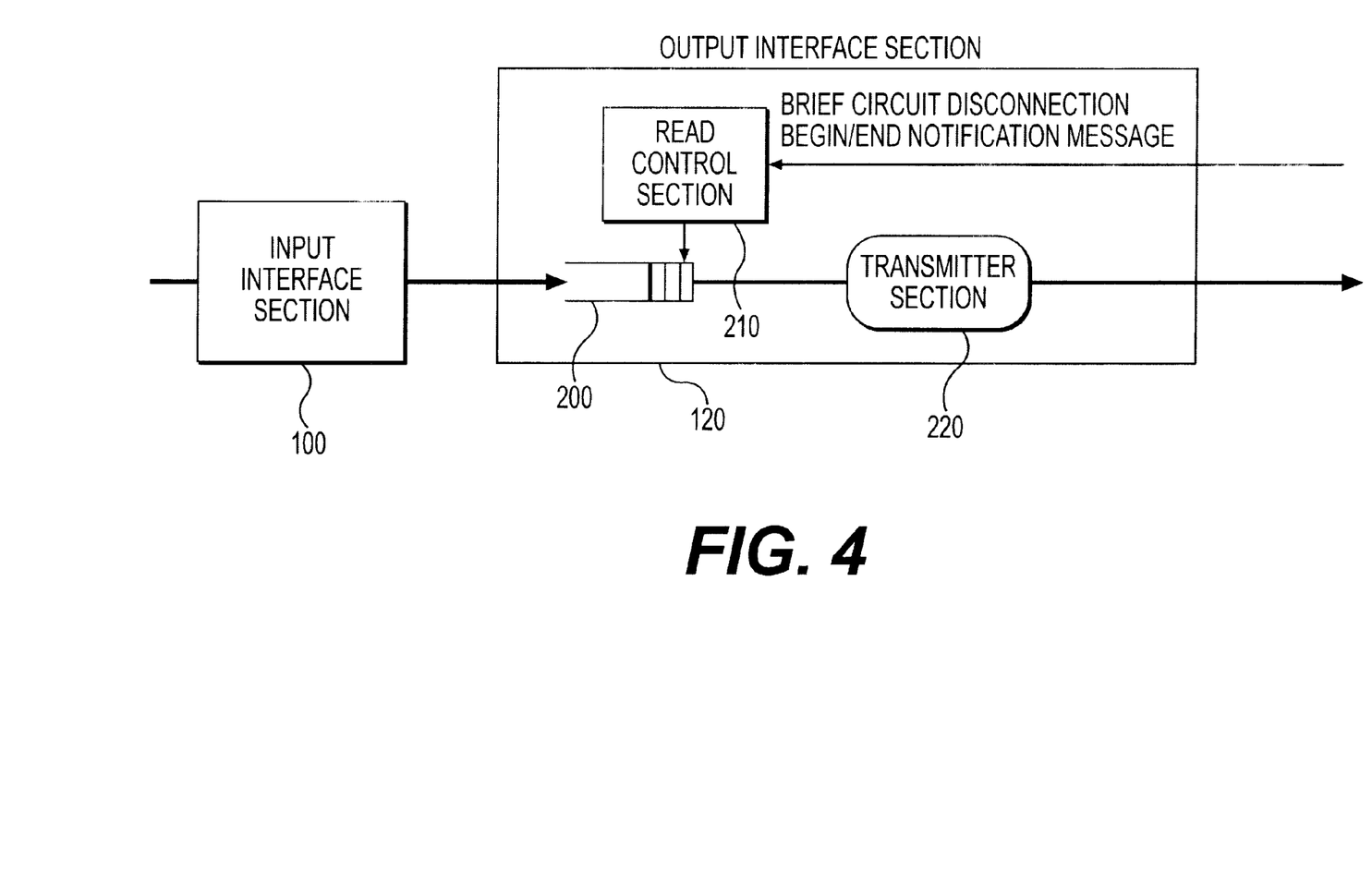
FIG. 4 shows a block diagram describing an example packet forwarding apparatus that functions as a repeater, based upon the embodiment of the present invention.

FIG. 3 shows an example configuration of a packet forwarding apparatus having the above function. The packet forwarding apparatus as in FIG. 3 includes an input interface section 100 for decomposing an input signal into packets, a switching section 110 for distributing each packet into a transport destination and an output interface section 120 for transmitting outgoing packets. The output interface section 120 further includes a storing means 200 for storing the packet, a read control section 210 for controlling a read from the storing means 200 and a transmitter section 220 for sending a packet data to a circuit switched network which provides a connection to an output destination. A brief disconnection begin notification which the circuit switched network sends at the time of halting the connection by the state transition is input to the read control section 210. When the brief disconnection begin notification is received, the read control section 210 stops reading data from the storing means 200 and thereafter, data arriving from the switching section 110 is stored into the storing means 200. A signal of the brief disconnection end notification is input as well to the read control section 210 and then, the read control section 210 restarts a read of data stored in the storing means 200 after the receipt of the input. When the storing means 200 has a capacity enough to store a packet data that arrives at the output interface section during the period between the receipt of the brief disconnection begin notification and the receipt of the brief disconnection end notification from the circuit switched network by the read control section 210, the data loss associated with the temporary halt of the circuit connection can be avoided. Moreover, it is not necessary to place the storing means between the switching section and the transmitter section as in FIG. 3 and the storing means may be anywhere on the data route between an optical-electrical signal conversion section and an electrical-optical signal conversion section in the packet forwarding apparatus. When a request signal from the circuit switched network is given to a read section of a memory apparatus on the route through which a packet input to the circuit passes, the same function as aforementioned may be realized. The embodiment of the present invention may be applied for a packet forwarding apparatus not having the switching section as shown in FIG. 4. In a configuration of FIG. 4, an input interface section and an output interface section are directly connected and a packet forwarding apparatus functions as a repeater not having a switching function.

When the circuit switched network halts its connection, a packet forwarding apparatus connected with a transmitter side of the circuit being halted has a redundant signal output interface that does not flow a packet data and a packet forwarding apparatus connected with a receiver side of the circuit has a redundant signal input interface that does not flow a packet data. When the circuit switched network can set an unused circuit that connects between the redundant signal input interface and the redundant signal output interface in packet forwarding apparatus connected with both transmitter and receiver sides of the circuit, it is possible to avoid or reduce data loss by transmitting a packet data to a circuit being a brief disconnection through the unused circuit between the redundant signal input/output interfaces.

Figure 5:
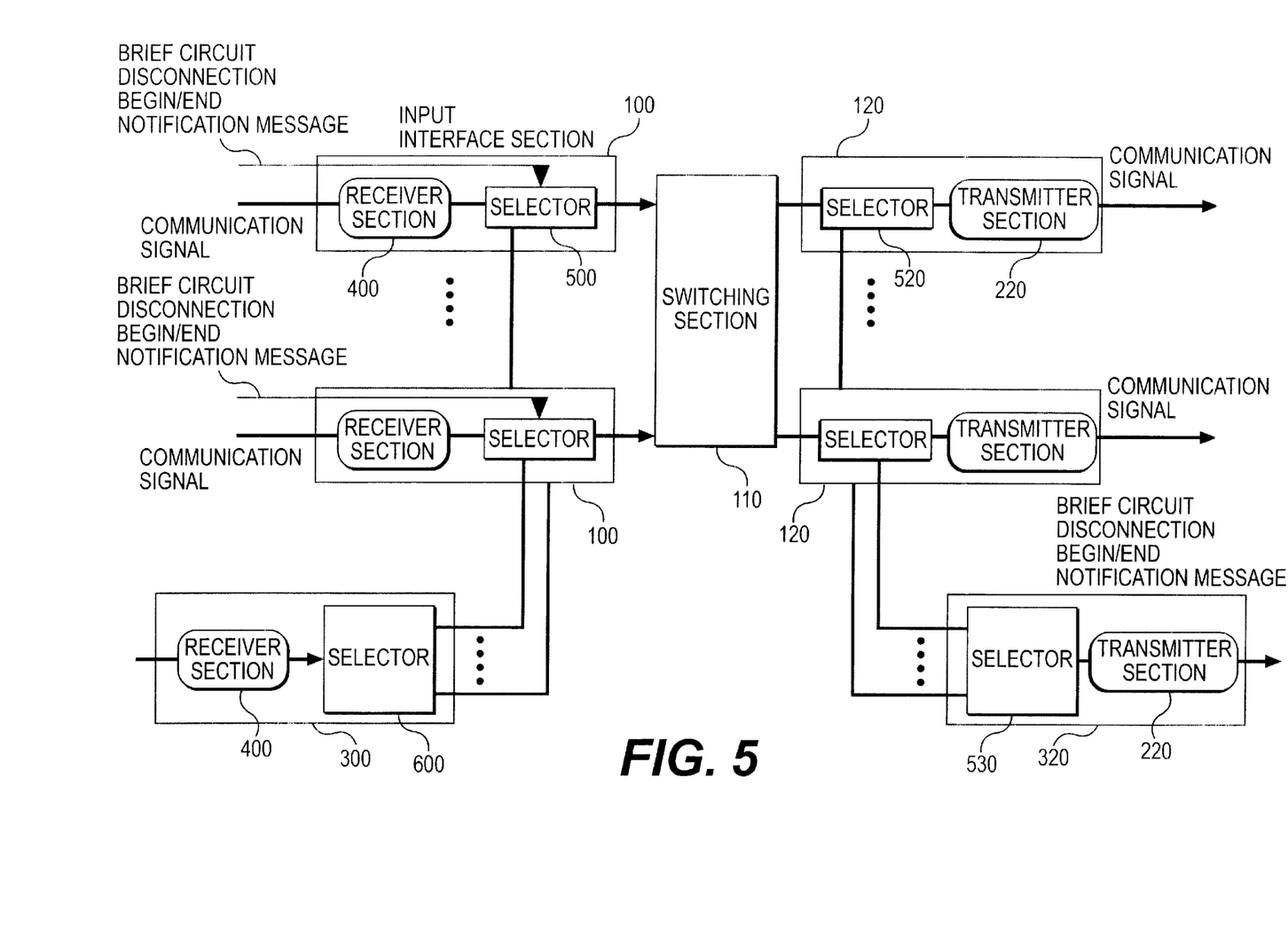
FIG. 5 shows a block diagram describing an example packet forwarding apparatus including a redundant circuit, based upon the embodiment of the present invention.

FIG. 5 shows an example configuration of a packet forwarding apparatus that realizes the above function. The packet forwarding apparatus as in FIG. 5 includes an input interface section 100, a redundant signal input interface section 300, a switching section 110, an output interface section 120 and a redundant signal output interface section 320. The input interface section 100 includes a receiver section 400 for receiving a signal and decomposing signal into packets and a selector 500 for selecting a signal from the receiver section of an input interface and a redundant signal input interface. The redundant signal input interface section 300 includes the receiver section 400 and a selector 600 for distributing an input signal into each input interface section. The output interface section 120 includes a transmitter section 220 and a selector 520 for selecting an output destination of a signal from a transmitter section of an output interface and a redundant signal output interface.

A redundant signal output interface section 320 includes the transmitter section 220 and a selector 530 for selecting an input signal from each output interface section. A brief disconnection begin notification and a brief disconnection end notification from the circuit switched network are input to the selector 530 for selecting a sending destination circuit. When the selector 530 receives the brief disconnection begin notification from any circuit switched network connected with any one of the output interface sections 120 in a packet forwarding apparatus, the output interface section 120 and the redundant signal output interface section 320 are connected.

The circuit switched network provides a connection between the redundant signal output interface section 320 and a redundant signal input interface section 300 on the receiver side of a packet forwarding apparatus connected with a receiver side of the circuit switched network. A route switching from the circuit switched network to a redundant circuit between the redundant signal output interface section 320 and the redundant signal input interface section 300 does not cause a packet data loss when a packet forwarding apparatus has a function of the switching without disconnection as indicated in the Japanese laid open patent No. 7-264210 and the Japanese laid open patent No. 8-139732. When the selector 530 receives the brief disconnection end notification, a switching from the redundant circuit between the redundant signal output interface section 320 and the redundant signal input interface section 300 to the circuit switched network is performed between packet switching apparatus. Moreover, for realizing the above function, it is not necessary to employ a selector distributed to a redundant signal output interface and for instance, in a packet forwarding apparatus where a redundant interface is connected directly with a switching section just like the circuit switched network, if the switching section has a function of the switching without disconnection, the same switching as in FIG. 5 is available.

The above procedure is based on the circuit switched network that operates normally. The normal operation means that when the circuit switched network is in state transition, the switching of the circuit switched network is done in the designated threshold value time. A threshold value time is set for the circuit cut off time not influencing a communication service utilizing the packet switched network. This non-influencing time is dependent on QoS (Quality of Service) provided by each service. The QoS is a word that indicates a general warrant range, such as a cut off time, a baud rate, a packet loss, etc., being set for a service or an user. For instance, in hypertext transport protocol (http) and file transfer protocol (ftp) on Transmission Control Protocol (hereinafter, TCP)/Internet protocol (hereinafter, IP), an abnormal transmission is detected by a non-receipt of a Hello packet. If there occurs no packet loss by applying the embodiment of the present invention, the disconnection time being a service cut off (disconnection of TCP/IP connection) is normally 30 seconds to 3 minutes. In case of the voice speech telephone, a service cut off occurs due to the connection cut off from 200 ms to 2 seconds depending upon what kind of switching apparatus is used. Where the QoS standardizes a baud rate for these services, if the baud rate is out of the warranted range even for a shorter time than the above service cut off time, there might have some problems to the service. In a real time video signal distribution service, a cut off time influencing the service depends on the transmission protocol being employed or the number of time frame being able to store by the buffer capacity on the side of receiver.

When the circuit switching is not performed normally, there is no temporarily brief disconnection. In a packet forwarding apparatus configured as in FIG. 3, it is not preferred to keep rerouting data for the storing means for a long period of time because the data rerouting causes an abandonment of the packet. Still it is not preferred to possess a redundant circuit for a long period of time in the communication network as in FIG. 2 because the possession of the redundant circuit deteriorates an error durability of the network. The above mentioned problem is solved by performing the halt of rerouting a packet data when a brief disconnection end notification signal is not received after more than the threshold value time is passed from the receipt of a brief disconnection begin notification signal. The packet data in which the halt of rerouting is performed is sent to the destination node via another route on the packet switched network. At this moment, the packet forwarding apparatus can notify of other packet forwarding apparatus the restriction on a packet transmission route occurred through an abnormality of the circuit switched network by sending an alarm packet useful for informing an unavailability of the usage of the connection. Further, when an alarm signal is sent from an output interface section connected with a circuit other than the circuit being unusable for notifying an abnormality of the circuit switched network, the circuit switched network can recognize an error even if the cause of an abnormal operation is an error which the circuit switched network itself can not recognize.

Through the aforementioned, although the communication network in which the packet switched network is overlaid onto the circuit switched network is described as a typical example, the embodiment of the present invention is generally applied for the communication network where the communication between the terminal apparatus performing a sending/receiving of a signal is performed via a transport network including the brief disconnection at the time of the state transition operation.

Figure 6:
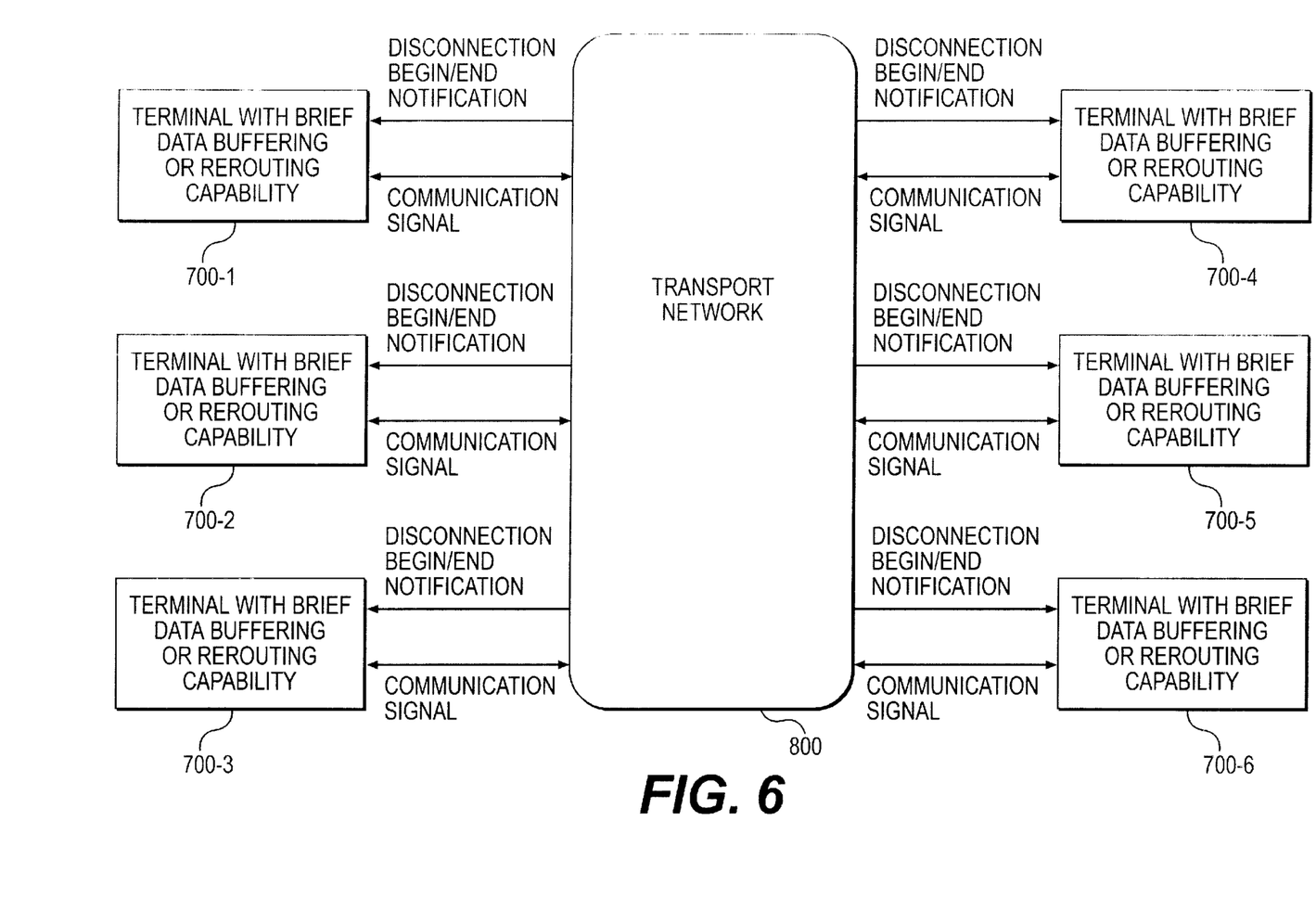
FIG. 6 shows a block diagram describing an example communication network based upon a second embodiment of the present invention.

FIG. 6 shows a configuration diagram of general communication network where the embodiment of the present invention is applied. The communication network as in FIG. 6 includes terminals with brief data buffering or rerouting capability 700-1 to 700-6 and a transport network 800 useful for giving a connection between the terminals 700-1 to 700-6. The connection includes not only a circuit but also a virtual circuit in a ATM network and a connection given by the packet switched network having a function to guarantee the conduction of data route. In FIG. 6, for instance, a terminal 700-1 acquires a communication data from the terminals 700-2 to 700-6 by inputting a data signal to the transport network 800 which sends the communication data to the terminals 700-2 to 700-6 and thereafter, by receiving the data signal output from the transport network 800. A communication between different terminals is available when the transport network 800 provides a connection between the above terminals. Even a communication between terminals not given a connection by the transport network 800 is available when other terminals have a repeater function of the communication data.

For instance, even if there is no connection given to terminals 700-1 and 700-2, when there is a connection given respectively to terminals 700-1 to 700-3 and to terminals 700-3 to 700-2, the transmission of the communication data between terminals 700-1 and 700-2 is performed by sending a communication data from a terminal 700-1 to a terminal 700-3 which relays the communication data to a terminal 700-2. In the aforementioned communication network, when the transport network 800 performs the state transition operation associated with the brief disconnection, there is provided a function useful for sending a brief disconnection begin notification to a terminal that transmits a communication data via a connection which undergoes the brief disconnection and for sending a brief disconnection end notification to the same terminal when a connection is restarted. Further, when a storing means or a redundant connection circuit are used for terminals and there is provided a function useful for rerouting a transmitted data for the storing means or the redundant connection circuit during the brief disconnection, the state transition operation of the transport network is available without influencing the communication between the terminals.

The embodiment of the present invention provides the following effect. In a network where a terminal for performing a sending/receiving of a signal employs a transport network as a transport medium that includes a brief disconnection at the time of the state transition operation in the circuit switched network, with respect to the embodiment of the present invention, a communication data loss between terminals is avoided by rerouting a communication data for the storing means or the redundant connection circuit at the time of a predictable state transition of the transport network.

However, when there occurs an unpredictable error in the circuit switched network, a communication data between terminals influenced by the error is lost during the period between the occurrence of the error and the receipt of the brief disconnection begin notification by the terminal. Nevertheless, a data loss after the communication data loss due to the error is avoided by activating an error recovery protocol of the transport network.

Accordingly, the reduction of the data loss through the state transition in the transport network is achieved.

Furthermore, the present invention provides communication networks and methods defined by the following points:

1. A communication network having a first packet forwarding apparatus, a second packet forwarding apparatus and a first transport route and a second transport route provided between the first packet forwarding apparatus and the second packet forwarding apparatus. Some means is provided for receiving from the communication network a halt instruction of the transmission of a packet data to the first transport route in the first packet forwarding apparatus and for halting the transmission of the packet data. Additionally, means for performing a change of route so that a packet data being transmitted from the first packet forwarding apparatus to the second packet forwarding apparatus via the first transport route is transmitted from the first packet forwarding apparatus to the second packet forwarding apparatus via the second transport route is also provided. A means for releasing the transmission halt of the packet data so that the packet data being halted the transmission is transferred from the first packet forwarding apparatus to the second packet forwarding apparatus via the second transport route after the change of route is completed is also provided by the present invention.

2. The communication network of point 1 has a feature in which during the period of halting the transmission of a packet data, the packet data is stored into a storing means of the first packet forwarding apparatus.

3. The storing means of point 2 has a storing capacity enough to store a packet data being received during the period of halting the transmission of the packet data.

4. A communication network having a first packet forwarding apparatus, a second packet forwarding apparatus and a first transport route, a second transport route and a third transport route provided between the first packet forwarding apparatus and the second packet forwarding apparatus, and means for performing a change of route so that a packet data being transmitted from the first packet forwarding apparatus to the second packet forwarding apparatus via the first transport route is transmitted from the first packet forwarding apparatus to the second packet forwarding apparatus via the second transport route. Also provided is means for performing a change of route so that prior to the change of route, a packet data being transmitted from the first packet forwarding apparatus to the second packet forwarding apparatus via the first transport route is transmitted from the first packet forwarding apparatus to the second packet forwarding apparatus via the third transport route. Additionally, there is provided means for performing a change of route so that after a change of route is completed so that a packet data being transmitted from the first packet forwarding apparatus to the second packet forwarding apparatus via the first transport route is transmitted from the first packet forwarding apparatus to the second packet forwarding apparatus via the second transport route, a packet data being transmitted from the first packet forwarding apparatus to the second packet forwarding apparatus via the third transport route is transmitted from the first packet forwarding apparatus to the second packet forwarding apparatus via the second transport route.

5. The communication networks discussed above in points 1–4 are arranged such that a packet switched network is overlaid on the circuit switched network.

6. In the communication networks of points 1–5, when a switching by the communication network does not end in the threshold value time set for the designated value less than a second from the start of the switching, a storing of the packet data into a storing means via the first transport route or a rerouting of the packet data for a redundant transport route are halted.

7. Furthermore, in the communication networks of points 1–6 when a switching by the communication network does not end in the threshold value time set for the designated value less than a second from the start of the switching, an alarm packet is transmitted to the second transport route.

8. Also, in the communication networks of points 1–7, when a switching by the communication network does not end in the threshold value time set for the designated value less than a second from the start of the switching, an alarm signal recognized by the circuit switched network is transmitted to the second transport route.

9. The present invention also provides a method for switching a communication network, which includes the steps of:
preparing the communication network having a first packet forwarding apparatus, a second packet forwarding apparatus and a first transport route and a second transport route provided between the first packet forwarding apparatus and the second packet forwarding apparatus;
after the first packet forwarding apparatus receives from another part of the communication network an instruction for halting the transmission of a packet data to the first transport route, halting the transmission of the packet data;
performing a change of route so that a packet data being transmitted from the first packet forwarding apparatus to the second packet forwarding apparatus via the first transport route is transmitted from the first packet forwarding apparatus to the second packet forwarding apparatus via the second transport route; and
after the completion of the change of route, releasing a halting of the transmission of the packet data so that the packet data being halted the transmission is transmitted from the first packet forwarding apparatus to the second packet forwarding apparatus via the second transport route.

10. In the method of point 9, the packet data is stored into a storing means during the period of halting the transmission of the packet data.

11. The storing means in the method of point 10 has a storing capacity enough to store a packet data received during the period of halting the transmission of the packet data.

12. The present invention also provides a method for switching a communication network comprising the steps of:
preparing the communication network having a first packet forwarding apparatus, a second packet forwarding apparatus and a first transport route, a second transport route and a third transport route provided between the first packet forwarding apparatus and the second packet forwarding apparatus;
performing a change of route so that a packet data being transmitted from the first packet forwarding apparatus to the second packet forwarding apparatus via the first transport route is transmitted from the first packet forwarding apparatus to the second packet forwarding apparatus via the second transport route;
prior to the change of route, performing a change of route so that a packet data being transmitted from the first packet forwarding apparatus to the second packet forwarding apparatus via the first transport route is transmitted from the first packet forwarding apparatus to the second packet forwarding apparatus via the third transport route; and
after a change of route is completed so that a packet data being transmitted from the first packet forwarding apparatus to the second packet forwarding apparatus via the first transport route is transmitted from the first packet forwarding apparatus to the second packet forwarding apparatus via the second transport route, performing a change of route so that a packet data being transmitted from the first packet forwarding apparatus to the second packet forwarding apparatus via the third transport route is transmitted from the first packet forwarding apparatus to the second packet forwarding apparatus via the second transport route.

13. In the above-mentioned methods of points 9–12, the communication network is prepared such that a packet switched network is overlaid on the circuit switched network.

14. The present invention also provides a packet transmission method comprising the steps of:
preparing a packet forwarding apparatus useful for transmitting a packet of an input transmission data; and
during the period from the receipt of a first signal to the receipt of a second signal, having a process useful for halting the transmission of a packet data to a first transport route.

15. In the packet transmission method of point 14, the step of having receives the first signal and the second signal via the first transport route.

16. In the packet transmission method of point 14, the first and second signals are received from a network control apparatus.

17. In the packet transmission method of points 14–16, the packet data is stored into a storing means of the packet forwarding apparatus during the period of halting the transmission of the packet data.

18. In the packet transmission method of point 17, the storing means includes a storing capacity large enough to store a packet data received during the period of halting the transmission of the packet data.

19. In the packet transmission method of claims 17 or 18, the storing means is prepared on at least one of the data transport routes between a switching section and a transmitter section of the packet forwarding apparatus or between an optical-electrical signal conversion section and an electrical-optical signal conversion section of the packet forwarding apparatus.

While the present invention has been described above in conjunction with the preferred embodiments and the above-mentioned points, one of ordinary skill in the art would be enabled by this disclosure to make various modifications to these embodiments and still be within the scope and spirit of the present invention as recited in the appended claims.

What is claimed is:

1. A packet forwarding apparatus comprising:

means for halting the transmission of a packet data to a route during a period between receipt of a first signal and receipt of a second signal;

storing means for storing the packet data during the period that the transmission of the packet data is halted;

wherein storing the packet data into the storing means through the route is halted when there is no receipt of the second signal within a designated amount of time from receipt of the first signal; and wherein the designated time is one of a time having a finite value less than a second, a time being smaller than a time difference between a time for receiving the first signal and a time when the storing capacity of a remaining portion of the storing means by the increase of a storing amount through the storing of the packet data becomes zero, a time standardized to be short to the extent that a session failure can not be recognized when there is a recognition of the session failure in an application for utilizing a session on a layer higher than a physical layer, a time being less than a time for satisfying quality of service (QoS) standardized by an application for utilizing a layer higher than the physical layer or a time being less than a service non-affecting time determined by QoS.

2. A packet forwarding apparatus for transmitting a packet of an input transmission data, comprising:

means for halting the transmission of a packet data to a route during a period between receipt of a first signal and receipt of a second signal;

means for rerouting a packet data for the route to an alternative route during the period of halting the transmission of the packet data;

wherein the reroute for the alternative route is halted when there is no receipt of the second signal within a designated time from a receiving time of the first signal; and wherein the designated time is either one of a time having a finite value less than a second, a time being smaller than a time difference between a time for receiving the first signal and a time when the storing capacity of a remaining portion of the storing means by an increase of a storing amount through the storing of the packet data becomes zero, a time standardized to be short to the extent that a session failure can not be recognized when there is a recognition of the session failure in an application for utilizing a session on a layer higher than a physical layer, a time being less than a time for satisfying QoS (quality of service) standardized by an application for utilizing a layer higher than the physical layer or a time being less than a service non-affecting time determined by QoS.

* * * * *